(12) United States Patent
Olson

(10) Patent No.: US 7,171,191 B2
(45) Date of Patent: Jan. 30, 2007

(54) USER DYNAMICALLY DEFINABLE CENTRALIZED NOTIFICATION BETWEEN PORTABLE DEVICES

(75) Inventor: Anthony M. Olson, Dakota Dunes, SD (US)

(73) Assignee: Gateway Inc., Irvine, CA (US)

( * ) Notice: Subject to any disclaimer, the term of this patent is extended or adjusted under 35 U.S.C. 154(b) by 824 days.

(21) Appl. No.: 10/118,103

(22) Filed: Apr. 8, 2002

(65) Prior Publication Data

US 2003/0191807 A1    Oct. 9, 2003

(51) Int. Cl.
*H04M 1/66* (2006.01)

(52) U.S. Cl. .............................. 455/412.2; 455/414.1; 455/412.1; 455/33.1; 455/436; 455/422; 370/338; 370/331; 370/351; 370/395.21

(58) Field of Classification Search ............. 455/412.2, 455/412.1, 414.1, 466, 422, 69, 33.1, 436, 455/461, 463; 709/249, 218; 370/338, 331, 370/351, 395.21, 395

See application file for complete search history.

(56) References Cited

U.S. PATENT DOCUMENTS

| | | | |
|---|---|---|---|
| 5,937,161 A | 8/1999 | Mulligan et al. | ...... 395/200.36 |
| 6,212,265 B1 | 4/2001 | Duphorne | ................... 379/142 |
| 6,216,165 B1 | 4/2001 | Woltz et al. | ................. 709/232 |
| 6,237,027 B1 | 5/2001 | Namekawa | ................. 709/206 |
| 6,260,148 B1 | 7/2001 | Aggarwal et al. | .......... 713/201 |
| 6,301,609 B1 | 10/2001 | Aravamudan et al. | ...... 709/207 |
| 6,691,173 B2* | 2/2004 | Morris et al. | ................ 709/249 |
| 2001/0034226 A1* | 10/2001 | Watanabe et al. | ........... 455/412 |

OTHER PUBLICATIONS

Sign up for Microsoft®.NET Alerts; http://alerts.microsoft.com/alerts/UserHome.asp; Nov. 19, 2001.
Keyola Notification Platform®.

* cited by examiner

*Primary Examiner*—Charles Appiah
*Assistant Examiner*—Randy Peaches
(74) *Attorney, Agent, or Firm*—Ross F. Hupt, Jr.; Douglas E. Jackson; Stites & Harbison PLLC

(57) ABSTRACT

The present invention is directed to a system and method for providing user dynamically definable centralized notification between portable devices. A system for providing centralized notification of receipt of data over networks may include a plurality of electronic devices suitable for communicating data directly between the plurality of portable devices utilizing a first network connection. At least one of the plurality of electronic devices is suitable for communicating over additional network connections for receiving data. In which, a device of the plurality of devices is specified to receive notifications over the first network connection of data received by the at least one of the plurality of portable electronic devices, so that notifications indicating data received by the plurality of portable electronic devices are sent to the specified portable electronic device.

24 Claims, 7 Drawing Sheets

USER DYNAMICALLY DEFINABLE CENTRALIZED NOTIFICATION BETWEEN PORTABLE DEVICES

FIELD OF THE INVENTION

The present invention generally relates to the field of portable electronic devices, and particularly to user dynamically definable centralized notification between portable devices, such as personal handheld devices and the like.

BACKGROUND OF THE INVENTION

Optimized data accessing solutions are needed to address the increases in technology, methods and variety of ways consumers access diverse types of data. For instance, a consumer may use a wireless telephone to speak with another person, but in other instances may want to access text messages, and therefore, utilize a text messaging pager or the like. Even though some communication functions have been further combined into single devices, these devices are typically not well suited to provide all the desired functions, i.e. instead of doing one thing well, a variety of functions are provided in different form factor devices, and consequently not in an optimized manner, causing a user to forgo certain desired functionality. Therefore, users may still wish to utilize a variety of portable devices to obtain the functionality desired.

Additionally, as new forms of data communication and updates to preexisting communication methods become available, a user may have even more devices. Thus, consumers wishing to avail themselves of all the different types of functionality may be forced to carry a wide range of devices, which may be tiresome, difficult to manage, and even more difficult to coordinate.

Further, because of the wide range of functionality offered by this diverse range of portable devices, certain devices may be optimized for specific situations. Therefore, it is often desirable to utilize one device over another device in a given situation. If the user wishes to access the functionality of multiple devices, the problem of coordination between devices is again encountered.

SUMMARY OF THE INVENTION

Accordingly, the present invention is directed to a system and method for providing user dynamically definable centralized notification between portable devices. In an aspect of the present invention, a system for centralized notification of receipt of data over networks includes a first electronic device suitable for communicating over a first network and a second network and notification control means in said first electronic device. The notification control means determine whether a centralized notification device has been selected, and, if so, sends a notification over said first network In an additional aspect of the present invention, a system for providing centralized notification of receipt of data over networks includes a plurality of electronic devices suitable for communicating data directly between the plurality of portable devices utilizing a first network connection. At least one of the plurality of electronic devices is suitable for communicating over additional network connections for receiving data. In which, a device of the plurality of devices is specified to receive notifications over the first network connection of data received by the at least one of the plurality of portable electronic devices, so that notifications indicating data received by the plurality of portable electronic devices are sent to the specified portable electronic device.

In a further aspect of the present invention, a method of centralized user notification from a plurality of electronic devices connected by a first network includes specifying one of the plurality of devices as a notification device to receive notifications from other of said devices. Data is received by a first device over a second network and a determination made as to whether a notification device has been specified. If so, a notification of receipt of data is transmitted by the first device to the notification device over the first network.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 6, exemplary embodiments of the present invention are shown. Consumers are becoming more and more "connected" through the accessibility of data even in mobile instances. For instance, today, consumers may have a variety of portable devices, from personal digital assistants, wireless phones including cell phones, portable information handling systems, and the like. These devices may have a wide range of functionality, and may access and deliver data utilizing a variety of similar and disparate mechanisms. However, the accessing and carrying of all theses different devices may become troublesome. Further, each device may have features tailored to specific situations, making them optimal in certain situations, but a liability in others. Therefore, the present invention provides user-definable notification between portable devices to enable a user to optimize the accessing of information by taking advantage of specific device characteristics.

Figure 1:
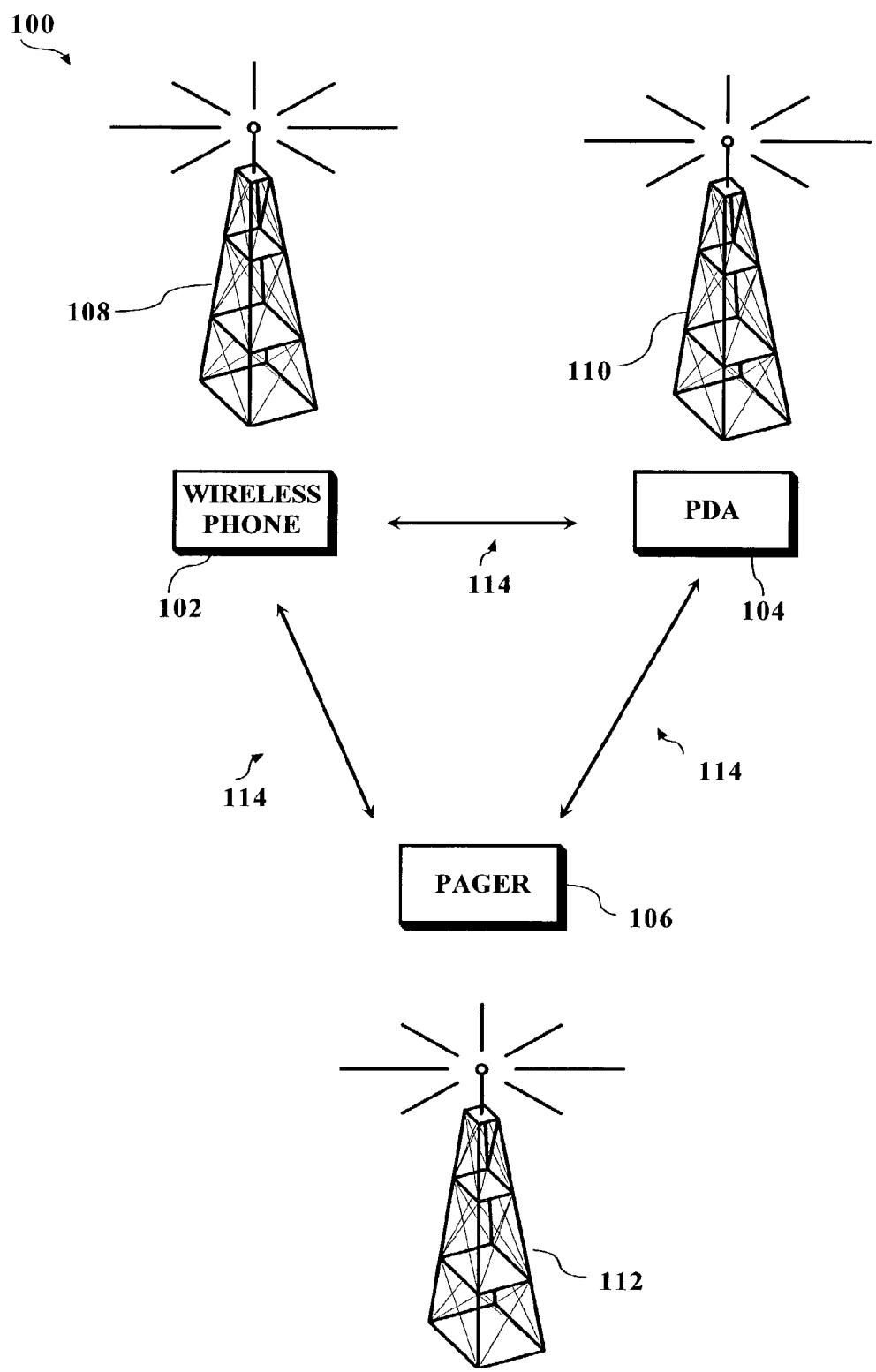
FIG. 1 is an illustration of an exemplary embodiment of the present invention wherein a system including a plurality of portable electronic devices capable of accessing data from diverse sources is shown.

Referring now to FIG. 1, an embodiment 100 of the present invention is shown within a system that includes a plurality of portable electronic devices. A user may utilize a variety of portable electronic devices to access data from diverse sources. The electronic devices may include a wireless phone 102, personal digital assistant 104, pager 106, portable information handling system and the like without departing from the spirit and scope of the present invention. Each of the devices may have functionality tailored to providing access in an optimized manner. For instance, a wireless phone 102 may enable a user to talk to other users of wireless or wired phones over a wireless network 108, such as a cellular network and the like. However, use of the wireless phone 102 may be obtrusive in certain instances, such as business meetings, movie theaters, and the like. Therefore, it may be desirable to receive notification of a call or message in such an instance over the pager 106. The pager 106 have a silent notification means, and may receive notifications of phone numbers, as well as to send and receive text messages in certain instances. Therefore, a user of the pager 106 may be able to communicate silently, and receive data in an unobtrusive manner. However, communication over the pager 106 may be inefficient in instances in which more than simple ideas need to be conveyed.

The portable devices typically receive data over different networks, though different devices may receive data over the same network without departing from the spirit of the invention. For instance, the wireless phone 102 may receive data over a cellular network 108, while a personal digital assistant 104 receives data over a different wireless network 110 and a pager 106 receives data over a paging network 112. Previously, to transfer data between the portable devices, the data needed to be transferred out over the first device network, to a device network supporting the second device, the second device local to the user. However, in an aspect of the present invention, local communication 114 between devices may be accomplished to enable efficient and easily configurable data transfer.

Figure 2:
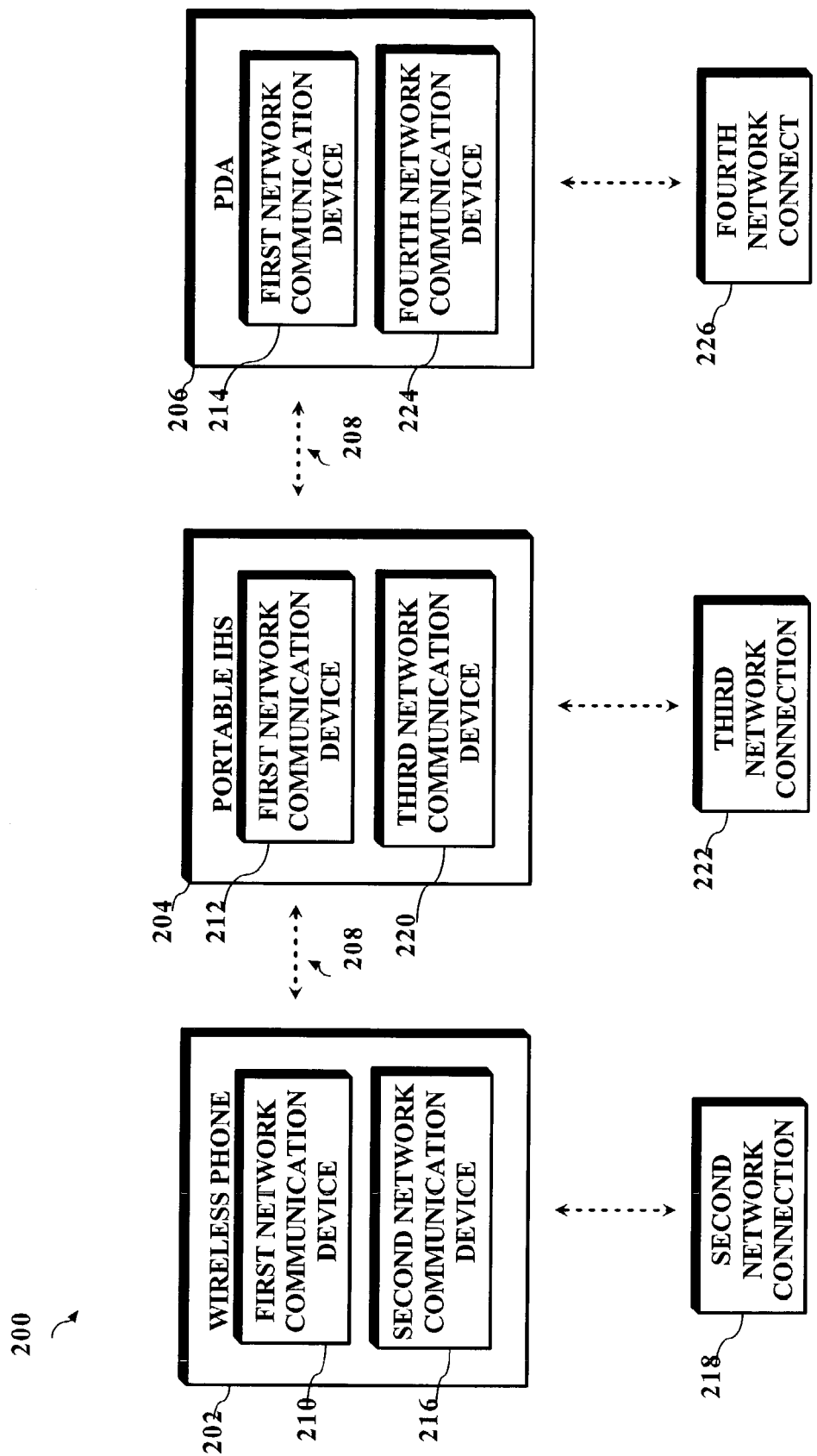
FIG. 2 is a block diagram of an embodiment of the present invention wherein portable electronic devices are configured for communication over a provider network and a local network to enable data transfer.

Referring now to FIG. 2, an embodiment 200 of the present invention is shown wherein portable electronic devices are configured for communication over a provider network and a local network to enable centralized notification. Portable electronic devices, such as wireless phone 202, portable information handling system 204, personal digital assistant 206, and the like, may be configured to communicate over a first network 208, having a first network specification including frequency, communication protocols, configurations and the like. For instance, the first network operates according to the Bluetooth protocol, 802.11 b protocol, cellular, IR 2.4 GHz, or similar wireless protocol. The portable electronic devices include first network communication devices 210, 212 & 214 configured in accordance with the first network specification to enable direct communication between the devices utilizing the first network.

Additionally, the portable electronic devices 202, 204 & 206 may include additional network communication devices to send and/or receive data over an additional network connection. For instance, the wireless phone 202 includes a second network communication device for communication over a second network 218 having a second network specification. Likewise, a portable information handling system 204 may include a third network communication device 220 for communication over a third network 222 having a third network specification, and a personal digital assistant 206 has a fourth network communication device 224 for communicating over a fourth network 226 having a fourth network specification.

In certain instances, network specifications may not be compatible, so that at least two of the second network communication device, third network communication device 220 and fourth network communication device 224 are not compatible. However, through use of the present invention, the network devices 202, 204 & 206 may still communicate over a local network connection, without encountering incompatibility issues and transfer issues through utilization of the second network connection 218, third network connection 222 and fourth network connection 226.

The present invention is directed toward providing a way for a user to specify one of his or her portable devices as a central notification device to notify the user of incoming messages from other portable or fixed devices. The user specifies one device for notification of data received by other portable devices. Such a specification may be tailored to the desires of a user depending on the user's situation. For example, a user may generally access multiple portable devices, such as a cell phone, PDA and pager. However, if the user is about to enter an important meeting, wherein full attention is needed and distractions are not tolerated, the user may select a pager to receive the notifications. The pager may be set to notify via a vibrate function, and thus, notifications would not disturb the meeting. The user's other portable devices may be kept in a briefcase and not require handling by the user, nor accessing each device individually to determine whether data was received.

Figure 3A:
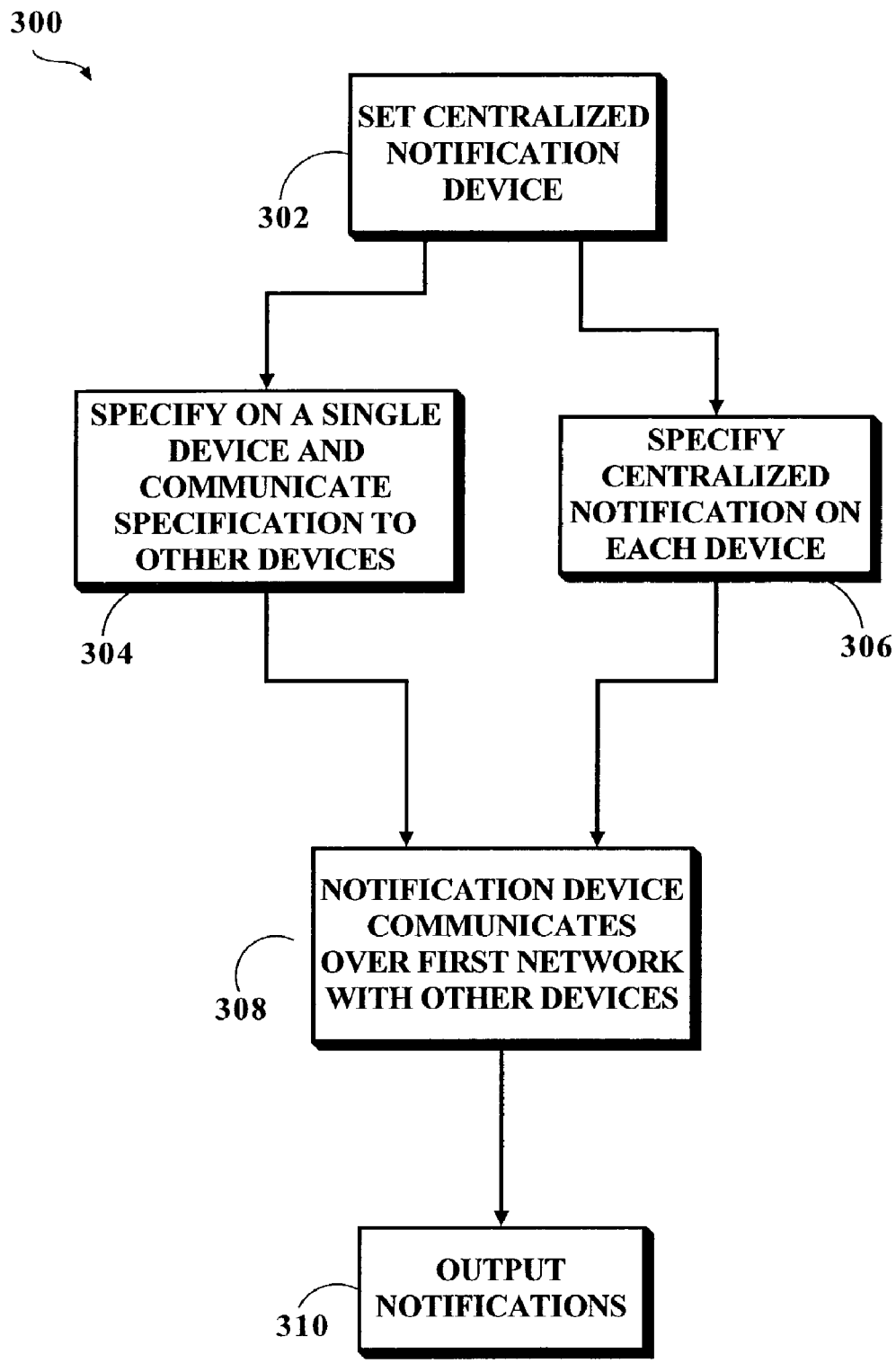
FIG. 3A is a flow diagram depicting an exemplary method of the present invention wherein devices are specified for central notification.

In a first embodiment each device has a function that allows the user to designate that device as a central notification point, as shown in the exemplary method 300 depicted in FIG. 3A. The function is implemented in software, firmware or hardware and is linked to the first communications network. Once the centralized notification is set 302, that device uses the first communication network to notify the other devices 304 that it is the central notification point. Alternatively, the user could access a function in each device that specifies which device is the central notification point 306. The central notification device communicates on the first communication network 308 and may have one or more other network connections. Thus, the central notification device may output notifications received from other devices 310 as specified 310. The centralized notification device may include a fixed device, such as a flashing light or other visible signal, connected to the first communication network.

Figure 3B:
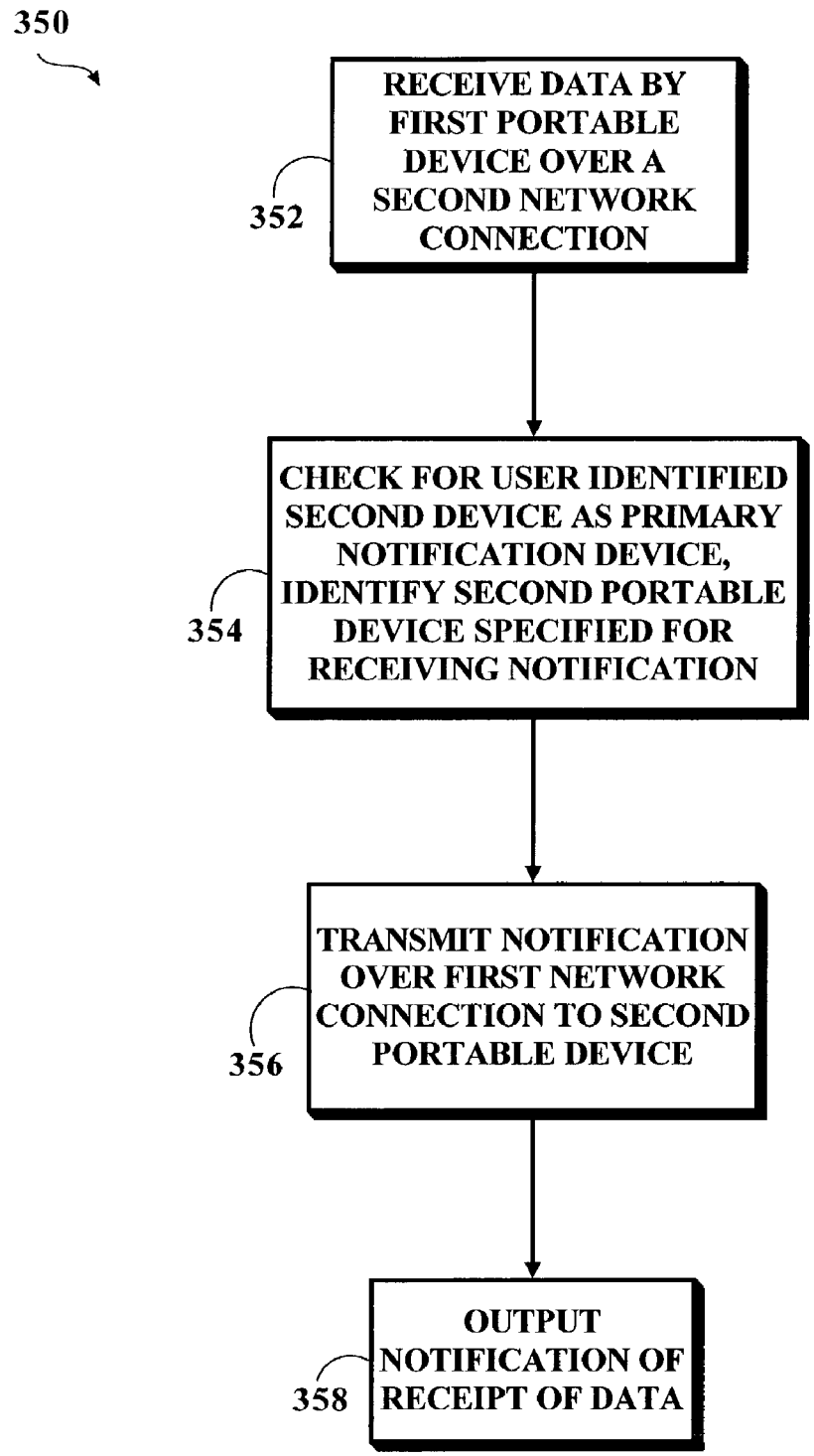
FIG. 3B is a flow diagram depicting an exemplary method of the present invention wherein data is transmitted to a specified device.

Referring now to FIG. 3B, an exemplary method 350 of the present invention is shown wherein data is transmitted to a specified device. Data is received by a first portable device over a second network connection 352. For example, as described in relation to FIGS. 1 & 2, data may be received over a wide area wireless network such as a cellular network and the like. The first portable device checks to see if the user has specified a second portable device as the primary notification, and if so, identifies a second portable device specified for receiving a notification 354. The notification is transmitted over a first network connection, such as a local network connection, to the second portable device as specified 356. A centralized or primary notification device receives indications of data received by other devices. The notification may be sent over a local network, such as a local wireless network such as Bluetooth, infrared, 802.11 b, and the like, as well as other wide area network means.

Figure 4:
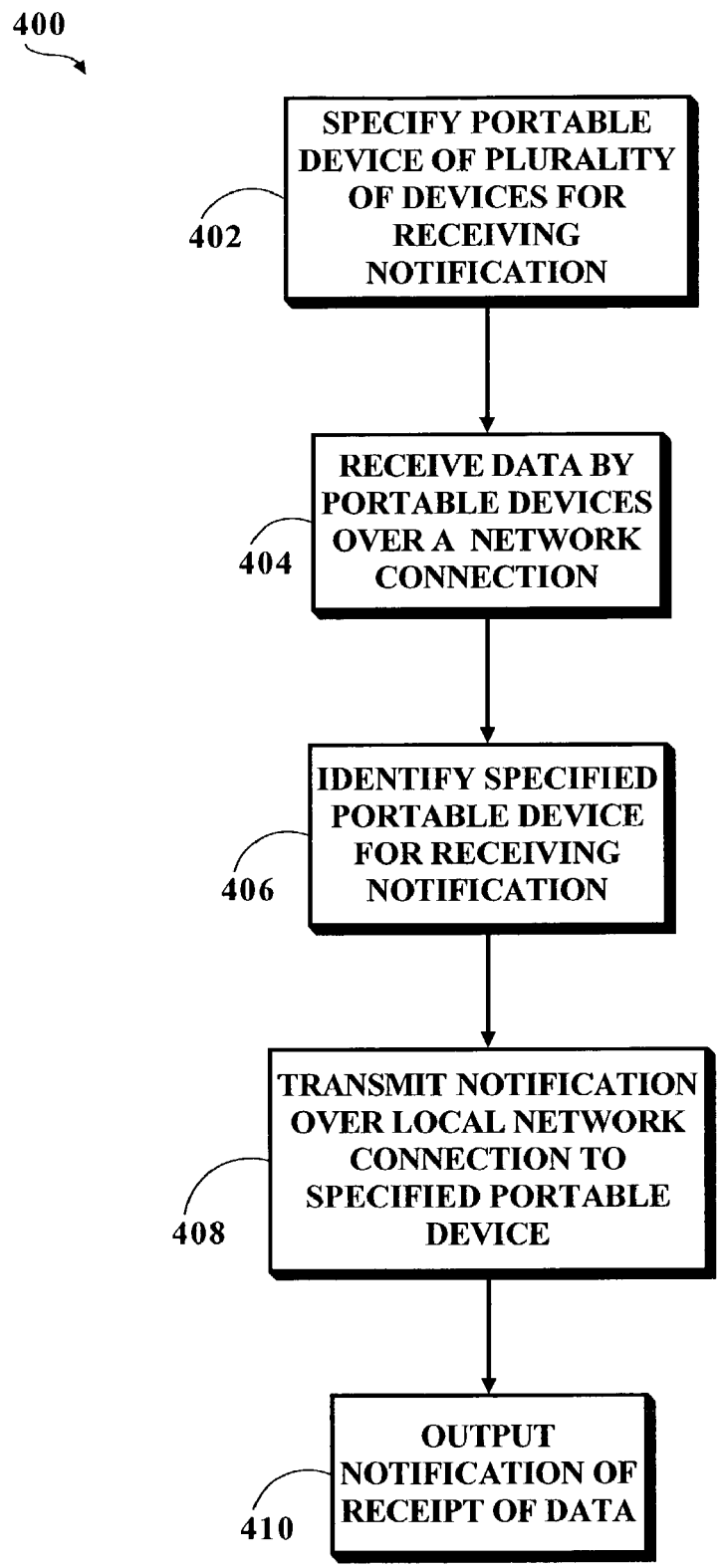
FIG. 4 is a flow diagram illustrating an exemplary method of the present invention wherein specifying a portable device of a plurality of devices for receiving a notification is performed.

Referring now to FIG. 4, an exemplary method 400 of the present invention is shown wherein specifying a portable or fixed device of a plurality of devices for receiving a notification is performed. A user may specify a device of a plurality of devices for receiving a notification 402. This specification may be made by accessing a menu contained on the portable device to select one from a listing of accessible devices to receive notifications. Thus, devices accessible to the portable device may be specified. Preferably, the data may be entered on one portable device of the plurality, and that specification communicated to the other devices automatically and without user intervention. Verification of selection may also be included. Although an example of specifying has been discussed, it should be apparent that a variety of mechanism and methods for specifying are contemplated by the present invention without departing from the spirit and scope thereof. For example, all devices may be specified so that a user may interact with any device of the plurality of devices to receive notifications.

When data is received by a portable device over a network connection 404, a specified portable device may need to be notified 406. For instance, a pointer to the centralized device may be included on the device itself indicating where to send data; the device may query other devices communicatively coupled to the device to determine which device is specified to receive notifications, and the like as contemplated by a person of ordinary skill in the art. The notification is then transmitted over a local network connection to the specified portable device 408, which may then deliver notification of receipt of data 410 by the originating device.

Figure 5:
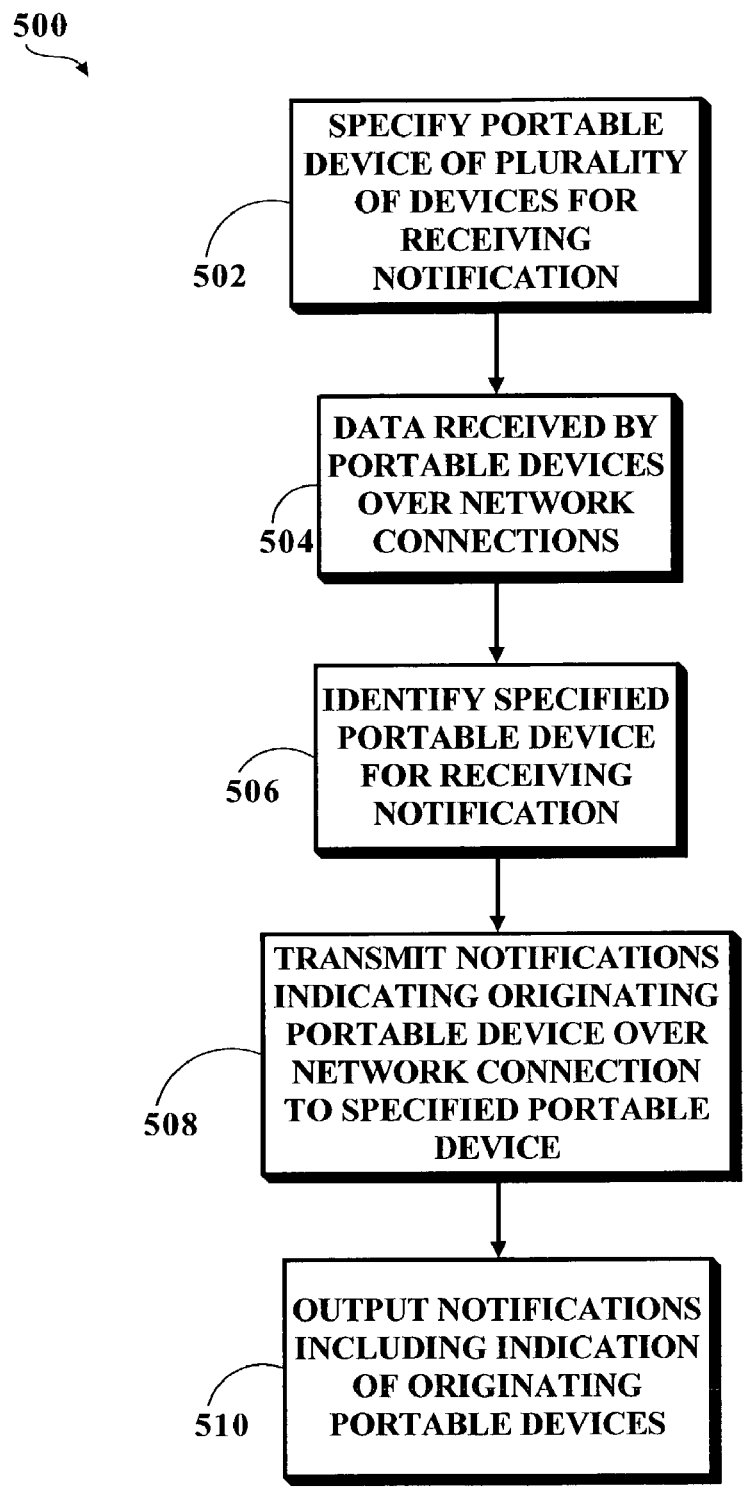
FIG. 5 is a flow diagram of an exemplary method of the present invention wherein a notification includes an indication of which device of a plurality of devices originated the notification.

Referring now to FIG. 5, an exemplary method 500 of the present invention is shown wherein a notification includes an indication of which device of a plurality of devices originated the notification. A portable device of a plurality of portable devices is specified for receiving a notification 502. Data is received by portable devices over network connection 504. For instance, a cellular phone and PDA may receive data, such as voice mail and an email message respectively. A specified portable device is identified for receiving the notification 506.

Notifications are then transmitted to the specified portable device, the notification indicating the device which originated the notification 508. The notification including the indication of origination is then output by the specified device 510. For instance, notification may indicate source through tactile output such as different pulses in a vibrating phone; visual using different representations; audio using different tones and cadences; and the like without departing from the spirit and scope of the present invention.

Figure 6:
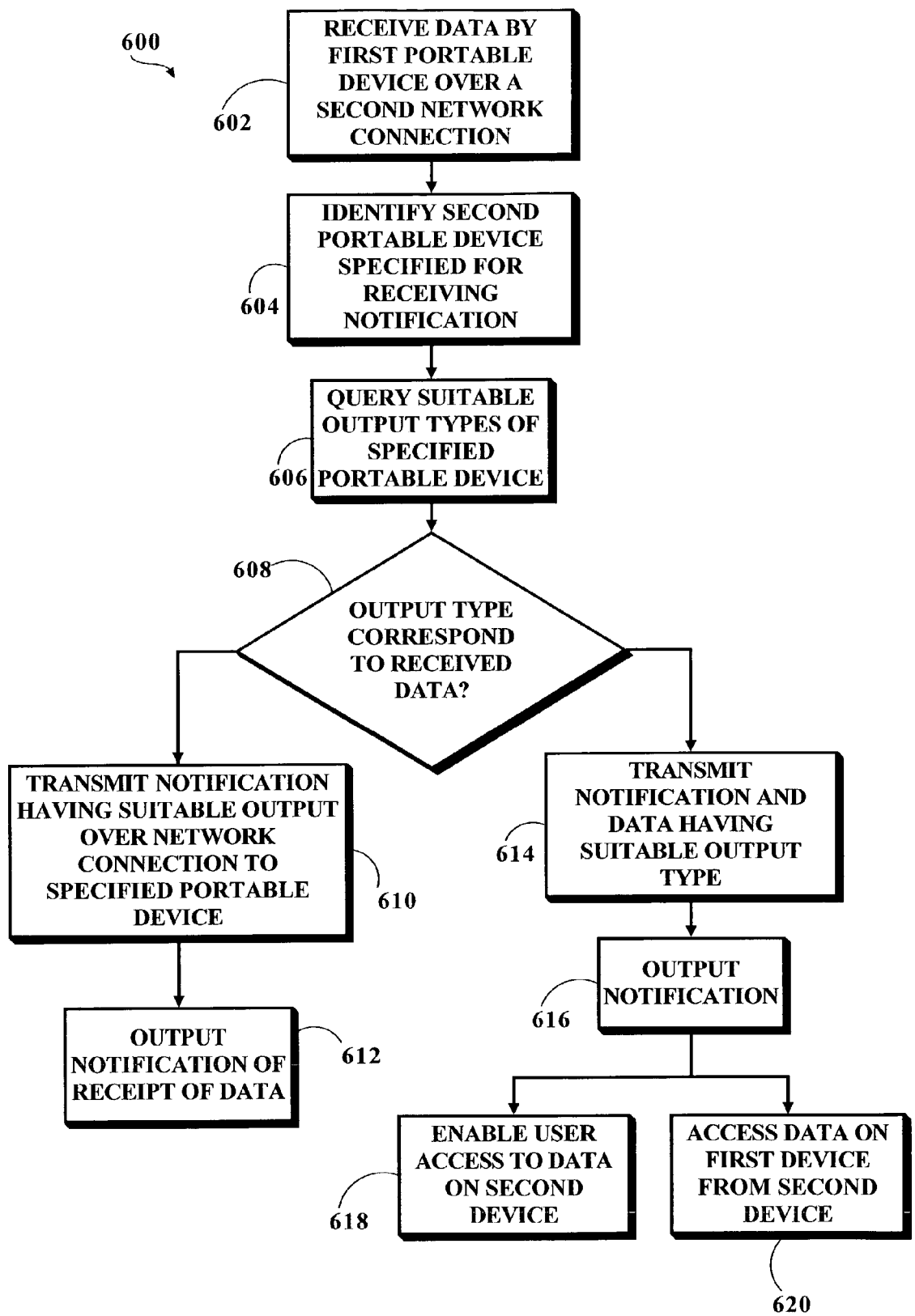
FIG. 6 is a flow diagram depicting an exemplary method of the present invention wherein support of output types is utilized to provide a notification and/or data in an optimized manner.

Referring now to FIG. 6, an exemplary method 600 of the present invention is shown wherein support of output types is utilized to provide a notification and/or data in an optimized manner. As stated earlier, different portable devices may be optimized to perform different functions, and therefore have various output capabilities. Therefore, to provide a notification in accordance with the output characteristics, suitable output types may be queried by the present invention. For example, data is received by a first portable device over a second network connection 602, such as a pager from a paging network. A second portable device is identified as being specified for receiving notifications 604. A query is then performed for suitable output types of specified portable device 606, such as whether the device supports visual output, audio, tactile and the like.

An additional determination may be made as to whether the output type corresponds to the received data 608. This may be useful to determine if the actual data received by the device should be forwarded for output by the second device. If the data type is not supported, a notification having suitable output format is transmitted over the network connection to the specified portable device 610. The notification is then output by the specified device. However, if the data type is supported 608, a notification including received data having suitable output type may be transmitted 614.

There are a variety of options for transmittal of received data contemplated by the present invention. For example, a notification may be output 616 that would prompt a user to access the data on the second device 618. Additionally, the data may be saved on the first device, and a display of the data transmitted upon initiation by a user, so that the user may access the data on the first device from the second device 620. Thus, the present invention provides for optimized output and transmittal of data depending on data type.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying claims present elements of the various steps in a sample order, and are not meant to be limited to the specific order or hierarchy presented.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for centralized notification of incoming messages between a plurality of electronic communication devices, comprising:

a first electronic device for communicating over a first local network and a second provider network, wherein said first electronic device communicates with a first communication service provider utilizing said second provider network;

a second electronic device for communicating over said first local network and a third provider network, wherein said second electronic device communicates with a second communication service provider utilizing said third provider network, and wherein said first electronic device and said second electronic device communicate directly with each other utilizing said first local network; and notification control means in said first electronic device and said second electronic device for:

allowing a user to select one of said first and second electronic devices as a central notification device for receiving incoming message notifications; and determining whether a centralized notification device has been selected in response to receiving an incoming message; and, if so, sending an incoming message notification over said first network to said centralized notification device.

2. The system as described in claim 1, wherein the first electronic device is portable.

3. The system as described in claim 1, wherein the first network is a wireless local area network and includes at least one of Bluetooth, infrared (IR) and IEEE 802.11 protocols.

4. The system as described in claim 1, wherein the notification represents which device of a plurality of devices originated the notification.

5. The system as described in claim 1, wherein notification includes utilizing at least one of tactile, audible and visual output.

6. The system as described in claim 1, wherein said second provider network is not compatible with said third provider network.

7. The system as described in claim 1, wherein the devices include at least one of a wireless phone, personal digital assistant and portable information handling system.

8. A method of centralized user notification of incoming messages between a plurality of electronic devices connectable by a first network, comprising the steps of:
   receiving a user specification of one of the plurality of devices as a central notification device to receive incoming message notifications from other of said devices;
   receiving an incoming message by a first device over a second provider network;
   determining by the first device whether a central notification device has been specified; and
   if so, transmitting an incoming message notification by the first device to the central notification device over the first network.

9. The method as described in claim 8, further comprising changing to a new specified device for receiving notifications from the previously specified device.

10. The method as described in claim 8 wherein the first electronic device is portable.

11. The method as described in claim 10, wherein the portable device includes at least one of a wireless phone, personal digital assistant and portable information handling system.

12. The method as described in claim 8, wherein the first network is a wireless local area network and includes at least one of Bluetooth, infrared (IR) and IEEE 802.11 protocols.

13. The method as described in claim 8, wherein the notification represents which device of a plurality of devices originated the notification.

14. The method as described in claim 8, wherein notification includes utilizing at least one of tactile, audible and visual output.

15. The method as described in claim 8, wherein at least one device of the plurality of devices is capable of communicating over a third network and is incapable of communicating over the second network.

16. The method as described in claim 8, wherein each device of the plurality of devices is specified to receive notifications.

17. A system for providing centralized notification of receipt of messages between a plurality of portable electronic communication devices, comprising:
   a plurality of portable electronic communication devices utilizing a first local network connection for communicating incoming message notifications directly between the plurality of portable devices, wherein each of the plurality of electronic devices is for communicating over at least one additional communication service provider network connection for receiving incoming messages through a communication service provider;
   wherein a device of the plurality of devices is specified by a user to receive notifications over the first network connection of incoming messages received by the plurality of portable electronic devices, so that incoming message notifications indicating incoming messages received by the plurality of portable electronic devices are sent to the specified portable electronic device.

18. The system as described in claim 17, further comprising changing the specification of the portable device to a new portable device of the plurality of devices.

19. The system as described in claim 17, wherein the local network connection is wireless and includes at least one of Bluetooth, infrared (IR) and IEEE 802.11.

20. The system as described in claim 17, wherein the notification represents which device of the plurality of devices originated the notification.

21. The system as described in claim 17, wherein notification includes utilizing at least one of tactile, audible and visual, the notification for indicating portable device origination of the notification.

22. The system as described in claim 17, wherein the additional provider network connections include at least one of a cellular network and a paging network.

23. The system as described in claim 17, wherein the portable devices include at least one of a wireless phone, a personal digital assistant and pager.

24. The system as described in claim 17, wherein each device of the plurality of devices is specified to receive notifications.

* * * * *